US005686683A

United States Patent [19]

Freed

[11] Patent Number: 5,686,683

[45] Date of Patent: Nov. 11, 1997

[54] INVERSE TRANSFORM NARROW BAND/ BROAD BAND SOUND SYNTHESIS

[75] Inventor: Adrian Freed, Berkeley, Calif.

[73] Assignee: The Regents of the University of California, Oakland, Calif.

[21] Appl. No.: 551,889

[22] Filed: Oct. 23, 1995

[51] Int. Cl.$^6$ .............................. G01H 7/00; G01H 7/10

[52] U.S. Cl. .............................. 84/625; 84/603; 84/622

[58] Field of Search .............................. 84/604–607, 622, 84/625, 603; 381/51

[56] References Cited

U.S. PATENT DOCUMENTS

| | | | |
|---|---|---|---|
| 4,856,068 | 8/1989 | Quatieri, Jr. et al. . | |
| 4,885,790 | 12/1989 | McAulay et al. . | |
| 4,937,873 | 6/1990 | McAulay et al. . | |
| 5,029,509 | 7/1991 | Serra et al. ............................ | 84/625 |
| 5,054,072 | 10/1991 | McAulay et al. . | |
| 5,327,518 | 7/1994 | George et al. . | |

OTHER PUBLICATIONS

Chamberlin, "Musical Applications of Microprocessors", *Dept. of Music, Stanford University*.

George et al., "A New Speech Coding Model Based on a Least–Squares Sinusoidal Representation", *School of Electrical Engineering, Georgia Institute of Technology* .

George et al., "Analysis–by–Synthesis/Overlap/Add Sinusoidal Modeling Applied to the Analysis and Synthesis of Musical Tones", *J. Audio Eng. Soc.*, 40:6, (1992).

George et al., "Generalized Overlap–Add Sinusoidal Modeling Applied to Quasi–Harmonic Tone Synthesis", *Signal Processing Center of Technology, Lockheed Sanders, Inc., School of Electrical Engineering, Georgia Institute of Technology.*

Lemke, M. et al., "Synthesis to time–dependent signals for simulation experiments", Abstract, *VDI Zeitschrift* 120, 10:475–82 (1978).

Race, "Race Insertion Interpolation", *DSP Development Corporation.*

*Primary Examiner*—Jonathan Wysocki

*Assistant Examiner*—Marlon T. Fletcher

*Attorney, Agent, or Firm*—Burns, Doane, Swecker & Mathis, L.L.P.

[57] ABSTRACT

An additive sound synthesis process for generating complex, realistic sounds is realized in a computationally efficient manner. In accordance with one aspect of the invention, polyphony is efficiently achieved by dosing the energy of a given partial between separate transform sums corresponding to different channels. In accordance with another aspect of the invention, noise is injected by randomly perturbing the phase of the sound, either on a per-partial basis or on a transform-sum basis. In the latter instance, the phase is perturbed in different regions of the spectrum to a degree determined by the amount of energy present in the respective regions of the spectrum. In accordance with yet another aspect of the invention, a transform sum representing a sound is processed in the transform domain to achieve with great economy effects achievable only at much greater expense outside the transform domain. Other transforms besides the Fourier transform may be used to advantage. For example, use of the Hartley transform produces comparable results but allows transforms to be computed at approximately twice the speed as the Fourier transform.

14 Claims, 6 Drawing Sheets

INVERSE TRANSFORM NARROW BAND/ BROAD BAND SOUND SYNTHESIS

BACKGROUND OF THE INVENTION

1. Field of the Invention

The present invention relates to computer-controlled sound synthesis, more particularly additive synthesis using an inverse transform technique.

2. State of the Art

The application of computers to sound synthesis has been studied and practiced for many years. Whereas the computer synthesis of simple sounds is straight-forward, the problem of synthesizing complex, realistic sounds such as the human voice, the sound of a piano chord being played, a bird call, etc., has posed a continuing challenge.

One well-known technique of synthesizing complex sounds is that of additive synthesis. In conventional additive synthesis, a collection of sinusoidal partials is added together to produce a complex sound. To produce a complex, realistic sound may require as many as 1000 sinusoidal partials to be added together. Each sinusoidal partial must be specified by at least frequency and amplitude, and possibly phase. Clearly, the computational challenge posed in producing complex, realistic sounds by additive synthesis is considerable.

Furthermore, the greatest benefit is obtained when additive synthesis is used to produce complex, realistic sounds in real time. That is, the synthesis system should be able to accept a series of records each specifying the parameters for a large number of partials and to produce from those records a complex, interesting, realistic sound without any user-perceptible delay.

Two approaches to additive synthesis have been followed. In the first approach (the time-domain, or wavetable, approach), the equivalent of a bank of oscillators has been used to directly generate sinusoidal partials. The frequency and amplitude values of all of the partials have been applied to the oscillators in the oscillator bank, and the resulting partials have been added together to produce the final sound. The requirement of directly computing each partial individually has limited the number of partials that may be included in a sound so as to allow the sound to be produced in a reasonable period of time.

In the second approach (the frequency-domain approach), partials have been specified and added in the frequency domain to produce a spectrum, or frequency-domain representation, of the final sound. The inverse Fourier transform is there used to compute the time-domain representation of the final sound, from which the sound is then produced.

An IFFF additive synthesis technique is described in U.S. Pat. No. 5,401,897, incorporated herein by reference. In the described additive sound synthesis process, sample blocks are determined by carrying out the inverse Fourier transform of successive frequency spectra. The sample blocks are time-superimposed and added to form a sequence of samples representing a sound wave. The latter procedure is known as overlap-add.

To achieve studio-quality sound reproduction, output samples are produced at a 44.1 or 48 KHz rate, i.e. one sample about every 20 microseconds. Because the human ear cannot readily distinguish auditory events spaced less than a few hundredths of a second apart, however, parameter sets containing control information describing the successive frequency spectra may be supplied at a low frequency (the update frequency), e.g. 200 Hz. Interpolation is then performed between two successive parameter sets surrounding the instant corresponding to a given sample in order to calculate the sample. In this manner, the generation of a succession of sudden variations of values is avoided, which would lead to noises or clicks occurring at the update frequency.

Referring more particularly to FIG. 1, control information describing successive spectra of the sound to be synthesized are stored in a table TAB1. Each partial is described in terms of the parameters frequency ($f_i$), amplitude ($A_i$) and phase ($\Phi_i$). In addition, a description of the spectral noise energy to be introduced into the synthesized signal (noise components $B_i$) is also stored, in a table TAB3.

A spectrum is built in accordance with well-known short-term Fourier techniques using a windowing function. Any of a number of appropriate windowing functions may be used, for example, the Harming windowing function. The time-domain windowing function is zero-padded and transformed using the discrete Fourier transform, thereby producing an oversampled "frequency domain window" having increased frequency resolution, which is stored in a table TAB2.

Stage 10 in FIG. 1 samples the frequency domain window as determined in accordance with the frequency $f_i$. The sample values are then multiplied by the amplitude $A_i$ weighted in accordance with a phase factor $e^{j\Phi i}$, producing a pattern (represented by the curve 12M in FIG. 1) representative of the specified partial. The resulting values are added to discrete frequency "bins" used to represent the spectrum being built. The frequency $f_i$ is used to align the values relative to the frequency boundaries of the frequency bins in the spectrum representation. The spectral representation of each successive partial $S_i$ is added to the previous sum $S_{i-1}$ of accumulated partials until all of the partials in a record have been added.

The resulting spectrum is composed of a large number of sinusoidal partials. However, in addition to periodic components, the presence of non-periodic components, i.e. noise, is fundamental to the creation of most interesting, realistic sounds, including musical sounds. Therefore, a noise component $B_i$ generated from the noise description stored in table TAB3 is added to the spectrum in stage 40. For example, the noise description may be obtained by convolving the spectral density of white noise with the frequency response of a selected filter and tabulating the results.

Adding the noise component $B_i$ to the spectrum is the last step in building a spectral representation of a complex, realistic sound. The following steps transform that spectral representation into a time representation. Once the spectrum has been formed, the discrete inverse Fourier transform is carded out by stage 50. Taking the inverse Fourier transform of the spectrum enables a sampling sequence to be obtained.

In order to produce the final signal representing the sound, successive sample blocks calculated by the IFFT stage 50 are shaped using a weighting curve stored in a table TAB4. The shaped sample blocks are then overlapped and added in stage 70, as shown diagrammatically in FIG. 2. The superposition of successive blocks mitigates the effects of calculation errors at the boundaries of the blocks.

To form the weighting curve, a function is chosen having the property that, when displaced by a certain number of samples and added to itself, a constant value is obtain throughout the overlap interval. The function may be, for example, a triangular function or a trapezoidal function. Sample values of the chosen function are divided by corresponding sample values of the frequency domain window. The results are stored in the table TAB4 and used to multiply the successive sample blocks in preparation for the overlap-add operation performed in stage 70 (FIG. 2). The overlap-add operation produces a sampling sequence that represents the sound wave and that may be filtered, smoothed, converted to an analog signal in a D/A converter 75, and amplified to produced a continuous electrical signal suitable for input to a sound transducer such as a loudspeaker.

Generation of the partial parameter sets stored in the table TAB1, although not specifically addressed in the foregoing patent, is typically accomplished using control structure 90. The control structure 90 generates blocks of data, each block specifying various partial in terms of their amplitudes and phases. An interpolator 100 is often used to generate an increased number of data sets in which transitions occur more smoothly, the interpolator being designed in such as a way as to minimize artifacts in the sound output. The interpolator 100 operates at a rate determined by a rate controller 80, that rate being governed at least in part by the rate of operation of the control structure 90 and the sample rate of the D/A converter 75.

Other patents relating to additive sound synthesis include the following: U.S. Pat. No. 4,856,068; U.S. Pat. No. 4,885,790; U.S. Pat. No. 4,937,873; U.S. Pat. No. 5,029,509; U.S. Pat. No. 5,054,072; and U.S. Pat. No. 5,327,518; all of which are incorporated herein by reference.

Prior art additive synthesis methods of the type described, however, have remained limited in several respects. The discrete Fourier transform alone is used to produce a spectral representation of the sound signals. Much research has focussed on efficient computation of the discrete Fourier transform. Nevertheless, the complexity of computations involved limits to a considerable degree the number of partials that can be computed in real time.

In part because of the computational complexity just mentioned, in prior art methods, typically only a single complex sound has been generated. That is, prior art methods have not included the simultaneous generation of distinct sounds (polyphonic or multi-channel sound). Also, the noise generation methods employed in the prior art have typically been limited to adding broadband noise shaped by an envelope function substantially independently of the sound being generated. This method of noise synthesis does not perform well in situations where pitch synchronous noise is required.

Furthermore, prior art methods have typically been limited to generating and playing sound described by pre-stored, analyzed parameters rather than values that change in real time during synthesis. These methods have typically not concerned intermediate processing of the sound representation.

SUMMARY OF THE INVENTION

The present invention, generally speaking, overcomes the foregoing disadvantages, allowing realization in a computationally efficient manner of an additive sound synthesis process for generating complex, realistic and controllable sounds. In accordance with one aspect of the invention, polyphony is efficiently achieved by dosing the energy of a given partial between separate transform sums corresponding to different channels. In accordance with another aspect of the invention, noise is injected by randomly perturbing the phase of the sound, either on a perpartial basis or on a transform-sum basis. In the latter instance, the phase is perturbed in different regions of the spectrum to a degree determined by the amount of energy present in the respective regions of the spectrum. In accordance with yet another aspect of the invention, a transform sum representing a sound is processed in the transform domain to achieve with great economy effects achievable only at much greater expense outside the transform domain. Other transforms besides the Fourier transform may be used to advantage. For example, use of the Hartley transform produces comparable results but produces a more regular structure that may lend itself to greater machine efficiency.

BRIEF DESCRIPTION OF THE DRAWING

The present invention may be further understood from the following description in conjunction with the appended drawing. In the drawing.

DETAILED DESCRIPTION OF THE PREFERRED EMBODIMENTS

In the following description, a clear separation is observed between sound synthesis per se and the distinct problem of producing parameters to be used to control sound synthesis so as to obtain production of a desired sound. Appropriate parameters for sound synthesis are assumed to be produced by and available from an appropriate control structure.

Figure 1:
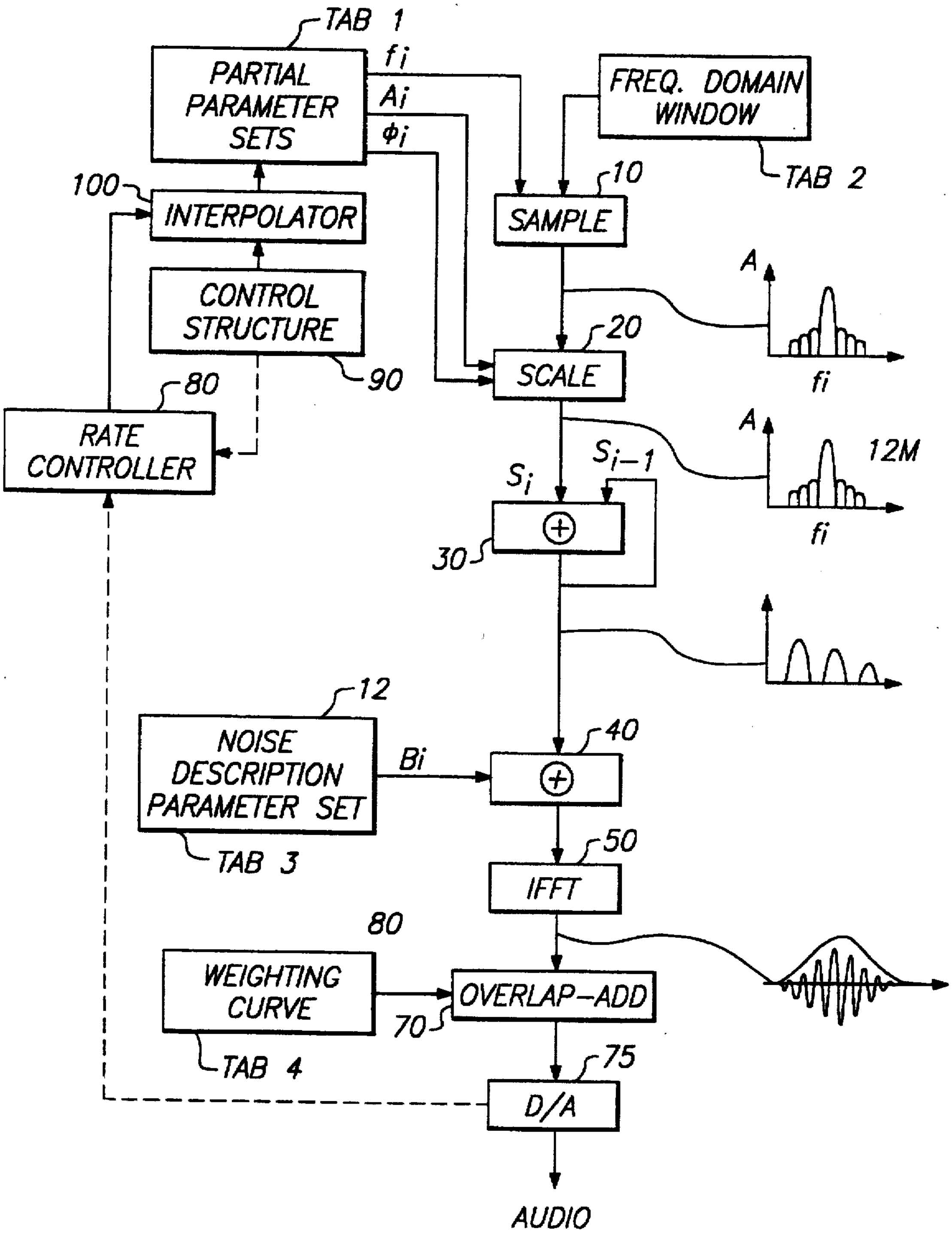
FIG. 1 (PRIOR ART)
FIG. 1 is a combination block diagram/signal diagram of a conventional sound synthesis process.
Figure 2:
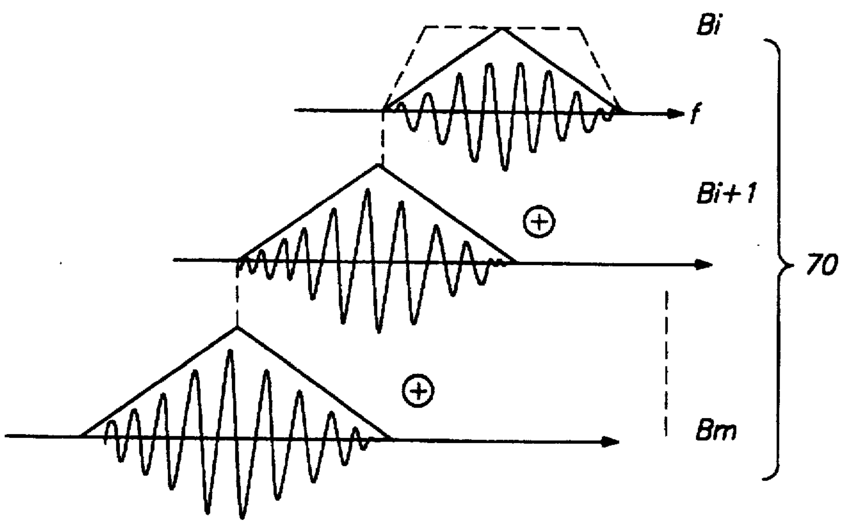
FIG. 2 (PRIOR ART)
FIG. 2 is a signal diagram illustrating a conventional overlap-add operation performed following the operations of FIG. 1.
Figure 3:
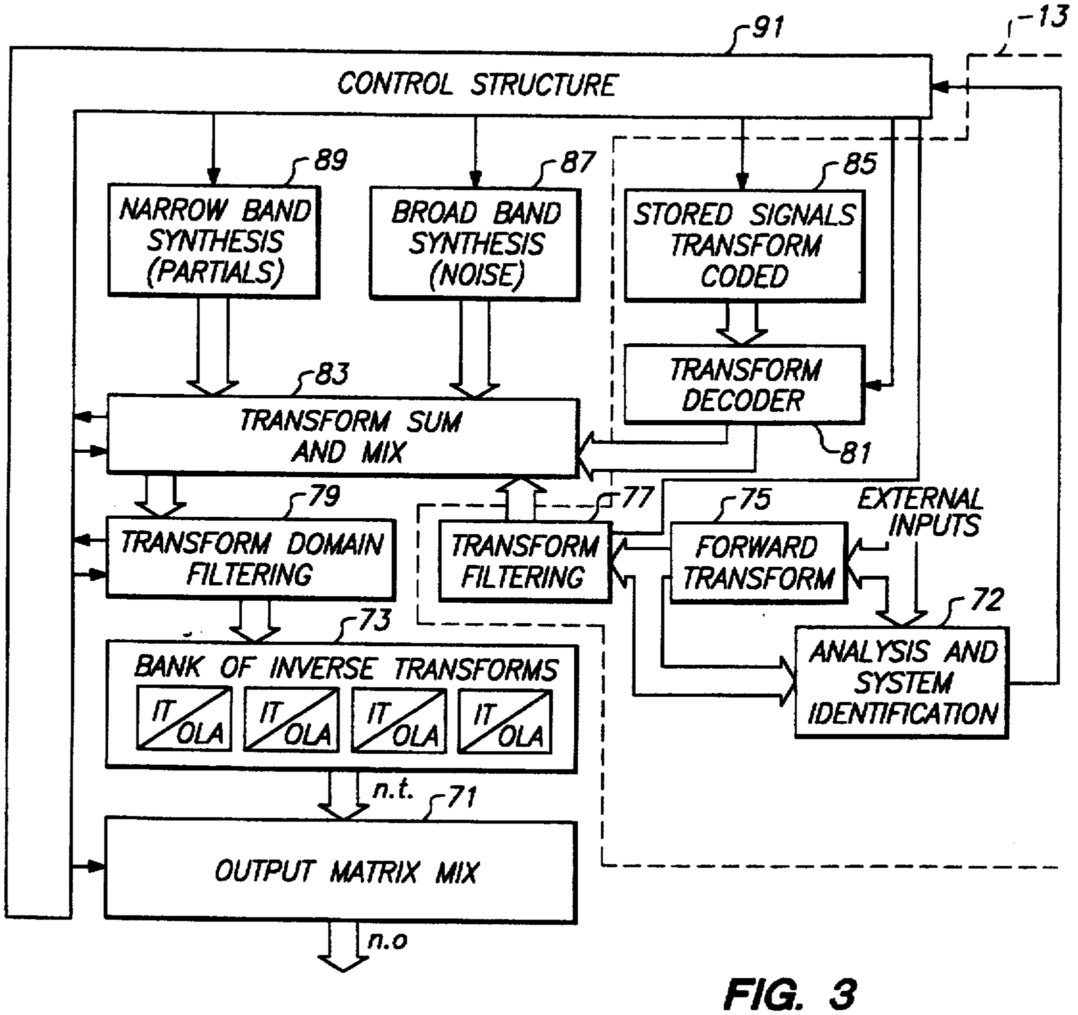
FIG. 3 is an overall block diagram of an inverse transform additive sound synthesis system in accordance with the present invention.

Referring now to FIG. 3, such a control structure 91 is shown. The control structure 91 provides parameters to various blocks of a sound synthesis system. The architecture of the system is designed so as to realize an extremely versatile sound synthesis system suitable for a wide variety of applications. Hence, certain blocks are provided whose functions may be omitted in a simpler sound synthesis system. Such blocks appear to the right of the dashed line 13 in FIG. 3. The function of the remaining blocks in FIG. 3 will therefore be described first.

In the prior art inverse transform additive sound synthesis system of U.S. Pat. No. 5,401,897, and in other conventional additive sound synthesis systems, a frequency spectrum is obtained by adding discrete spectral components grouped in spectral envelopes. Each spectral envelope corresponds to a sinusoidal component or a spectral noise band. Noise bands are statistically independent, i.e., generated by a mechanism independently defined and unrelated to the mechanism by which the sinusoidal components are generated.

In the present inverse transform additive sound synthesis system, on the other hand, partials need not be sinusoidal but may assume any of various forms of narrow band components. Hence, although the terms "spectrum", "spectra" and "spectral" may be used for convenience in describing the present invention, it should be understood that these terms are used in the broad sense to connote a sound representation in a domain other than the time domain, and do not necessarily connote representation in terms of sinusoidal components. Furthermore, broad band components, rather than being defined independently of the narrowband components, may be generated such that the broad-band-component generating mechanism is bound up in the narrow-band-component generating mechanism. Consequently, the blocks 89 and 87 in FIG. 3, although they may be considered to bear a superficial correspondence with the prior art mechanisms of generating sinusoidal partials and noise bands, respectively, should be thought of more generally as performing narrow-band synthesis (89) and broad-band synthesis (87). The narrow-band synthesis block 89 and the broad-band synthesis block 87 are controlled by control signals from the control structure 91.

Narrow-band components and broad-band components are added together in a transform sum-and mix-block 83. The transform sum-and-mix block 83 is controlled by control signals from the control structure 91. The transform sum-and-mix block 83 allows for selective distribution, or "dosing," of energy in a given partial between separate transform sums. This feature provides the capability for polyphonic effects in a manner described in greater detail below in relation to FIG. 7 and FIG. 8.

The transform sum-and-mix block also provides signals to the control structure 91. Considerable advantage may be obtained by, for example, using the spectral representation found in one or more of the transform sums to provide a real-time visual display of the spectrum or other properties of a signal. Since a transform-domain representation of the signal has already been created, only a minimum of additional processing is required to format the data for presentation. A transform sum (e.g., constructed spectrum) may be displayed, as well as the magnitudes and frequencies of individual partials.

Furthermore, the spectral representation found in one or more of the transform sums may be used as real-time feedback to the control structure 91 to influence further generation of the same transform sum or the generation of a subsequent transform sum.

A transform domain filtering block 79 receives transform sums from the transform sum-and-mix block and is designed to perform various types of processing of the transform sums in the transform domain. The transform domain filtering block 79 is controlled by control signals from, and provides signals to, the control structure 79. The transform domain lends itself to readily performing various types of processing that can be performed in the time domain or the signal domain only with considerably greater difficulty and expense.

Transform domain processing allows accommodation of known perceptual mechanisms, as well as adaptation to constraints imposed by the environment in which the synthesized sound is to be heard. By way of example only, transform domain processing may be used to perform automatic gain control or frequency-dependent gain control. Similarly, simulations of auditory perception may be used to effectively "listen" to the sound representation before it is synthesized and then alter the sound representation to remove objectional sounds or perceptually orthogonalize the control parameter space.

Following transform domain processing, the sound representation is synthesized using a bank of inverse transform/overlap-add operations 73 to transform each transform sum. Each inverse transform IT indicated in FIG. 3 bears an approximate correspondence to the conventional inverse Fourier transform previously described. However, the inverse transform need not be a Fourier inverse transform, but may be a Hartley inverse transform or other appropriate inverse transform. Those familiar with the art will be able to readily adapt practice of the invention to any of the know transforms including, for example, Fourier, Hartley, wavelet, Haar, Walsh, Zak, etc. The number of transforms computed, n.t., is limited only by the available computational power.

Time-sampled signals produced by the inverse transform/overlap-add bank 73 are input to an output matrix mix block 71. The output matrix mix block is realized in a conventional manner and is used to produce a number of output signals, n.o., which may be the same as or different than the number of transforms computed, n.t. The output signals are D-to-A converted and output to appropriate sound transducers.

The sound synthesis system described produces sounds from a parametric description. To achieve greater flexibility and generality, the blocks to the right of the dashed line 13 may be added. These blocks allow stored sounds, real-time sounds, or both, to be input to the system.

Sound signals that are transform coded are stored in a block 85. Under control of the control structure 91, these signals may be retrieved, transform decoded in a transform decode block 81, and added to one or more transform sums. The stored signals may represent pre-stored sounds, for example.

Real-time signals may be input to block 75, where they are forward transformed. A block 77 then performs transform filtering of the input signals. The filtered, transformed signals are then added to one or more transform sums under the control of the control structure 91.

In addition, the real-time signal and its transform may be input to a block 72 that performs analysis and system identification. System identification involves deriving a parametric representation of the signal. Results from an analyzed spectrum may be fed back to the control structure 91 and used in the course of construction of subsequent spectra or the modification of the current spectrum.

Figure 4:
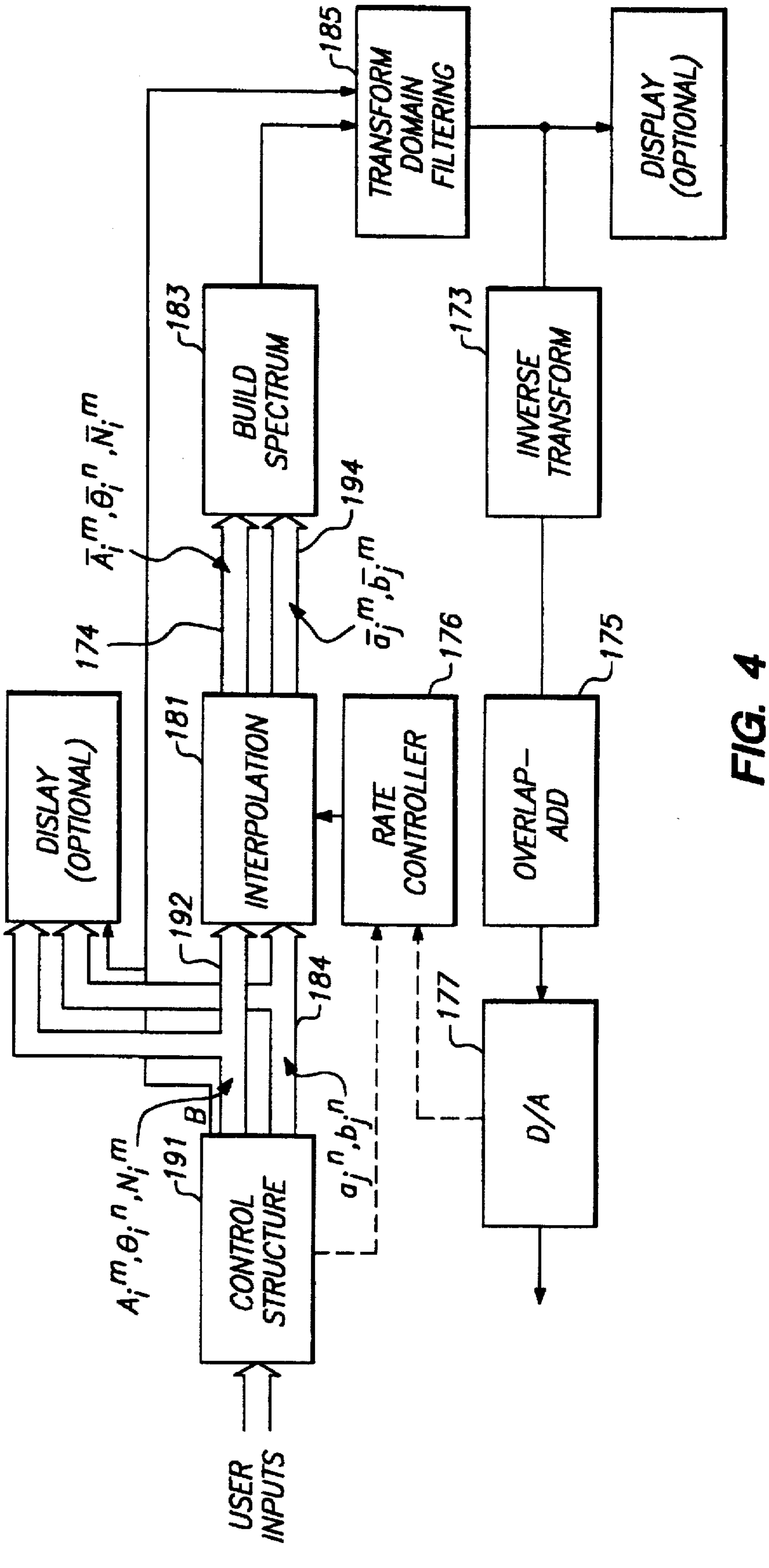
FIG. 4 is a simplified block diagram corresponding to a single channel of the sound synthesis system of FIG. 3.

A more detailed understanding of the present inverse transform additive sound synthesis system may be obtained by considering the case of generating a monophonic sound from a parametric description without any additional sound inputs. Referring to FIG. 4, a control structure 191 receive user inputs (e.g., from a computer keyboard or other computer input device, or from a musical instrument) and in response thereto produces two sets of signals 192 and 184. The first set of signals 192 describes the narrow band characteristics of the sound to be generated, in terms of the amplitudes, $A_i^n$, phases, $\phi_i^n$, and noise components, $N_i^n$, of a number of predetermined partials. The individual partials are indicated by the subscript "i." Successive sets of partials are indicated by the superscript "n." The second set of signals 184 describes the broad band characteristic of the sound to be generated, in terms of one or more noise amplitudes, $a_j^n$, and corresponding frequency bands, $b_j^n$. The number of noise components may specified independently of the number of partials. In a preferred embodiment, the number of noise components is typically between 12 and 20. A further signal B is a global noisiness parameter. The parameters $N_i^n$ and B, as described more fully below, are used to inject noise into the sound by randomly perturbing the phase of the sound, on a per-partial basis and on a transform-sum basis, respectively.

The two sets of signals 192 and 184 are input to an interpolation block 181. The interpolation block 181 outputs at a higher rate a set of signals 174 and 194. The first set of signals 174 describes the narrow band characteristics of the sound to be generated, in terms of interpolated amplitudes, $\bar{A}_i^m$, interpolated phases, $\bar{\Phi}_i^m$, and interpolated noise components $\bar{N}_i^m$, of the predetermined partials. The individual partials are again indicated by the subscript "i." Successive sets of partials (rate-multiplied as compared to the successive sets of partials indicated by the superscript "n") are indicated by the superscript "m." The second set of signals 194 describes the broad band noise characteristics of the sound to be generated, in terms of interpolated noise amplitudes $\bar{a}_j^m$, and corresponding interpolated frequency bands, $\bar{b}_j^m$.

The interpolator 181 operates at a rate determined by a rate controller 176, that rate being governed at least in part by the rate of operation of the control structure 91 and the sample rate of a D/A converter 177.

The signals 174 and 194 are input to a build spectrum block 183. A spectrum is simply a set of numbers representing the energy within each of a predetermined number of frequency "bins." In the build spectrum block, the frequency domain window is sampled, scaled and added in the appropriate alignment to respective bins in the spectrum as in conventional inverse-transform additive synthesis systems. Noise is added to the spectrum in a manner described in detail hereinafter. The spectrum is then input to a transform domain filtering block 185. In this block, the spectrum may be filtered or processed in any desired manner as described previously. The filtered spectrum is then reconstructed into a time-sampled representation of the specified sound by an inverse transform block 173 followed by an overlap-add block 175. The operation of both of these blocks is well-known in the art.

Understanding of sound-generation processes may be furthered by producing a visual display of a sound. Such a display is commonly produced by graphic equalizers, for example. Note in FIG. 4, however, that information related to the sound to be produced may be displayed, before the actual sound samples have been produced, either during the control specification phase by displaying the outputs of the control structure 191, or in the transform domain by displaying the output of the transform domain filtering block 185. Whereas the latter presents information about the spectrum that is to be heard, the former more particularly presents information about the processes controlling the sound that is heard.

The signals 194 in FIG. 4 describe the broad band noise characteristics of the sound to be generated, in terms of interpolated noise amplitudes $\bar{a}_j^m$, and corresponding interpolated frequency bands $\bar{b}_j^m$, and may be used to inject noise into the spectrum on a frequency-band basis. This is done independently from building of the narrow band spectrum based on partials. In particular, a random phase is generated for each interpolated frequency band, $\bar{b}_j^m$, which is paired with a corresponding interpolated noise amplitude $\bar{a}_j^m$, converted to rectangular coordinates, and added into each frequency bin within the spectrum contained within the frequency band. This manner of noise injection is known in the art, for example from U.S. Pat. No. 5,029,509 and from Lemke et al., Synthesis Of Time-dependent Signals For Simulation Experiments (VDI Zeitschrift, May 1978, vol. 120, (no. 10): 475–82).

Figure 5:
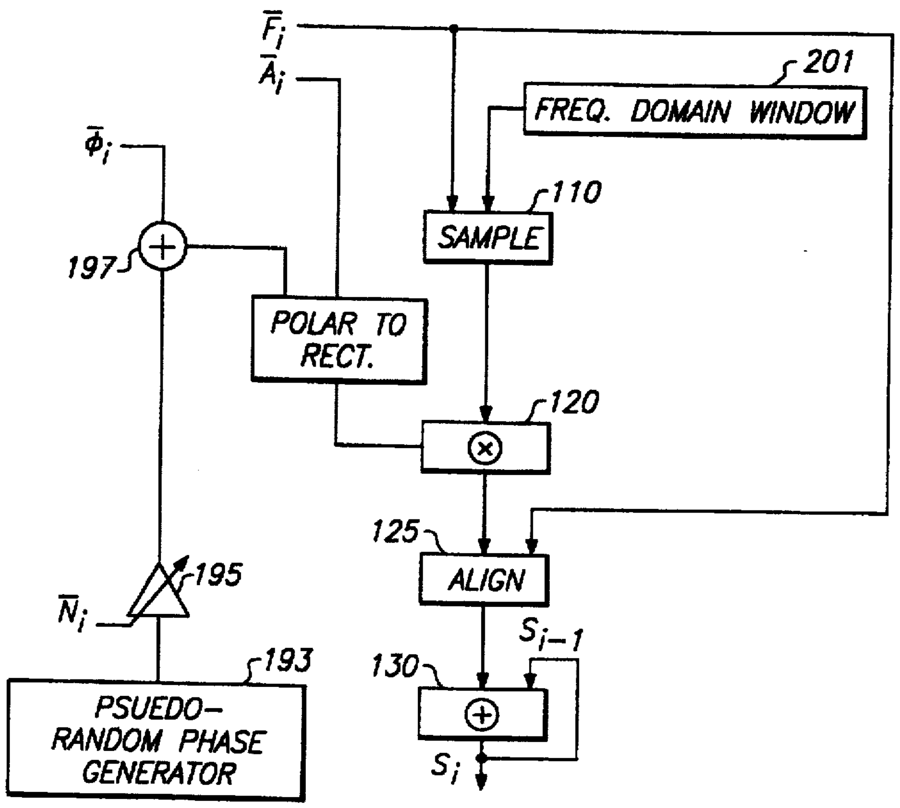
FIG. 5 is a block diagram of a broadband synthesis portion of the sound synthesis system of FIG. 3 in accordance with one embodiment of the invention.

However, in instances where noise is to be related to or synchronized with partials, another noise injection method may be accomplished as shown in FIG. 5. A partial is specified in terms of frequency ($\bar{F}_i$), amplitude ($\bar{A}_i$), and phase ($\bar{\Phi}_i$). The frequency determines which samples of the stored frequency domain window 201 will be chosen in the sampling block 110 to be added to the spectrum. The amplitude and phase are used to multiply the chosen samples in a multiplier block 120. The frequency $\bar{F}_i$ is used to align the samples in block 125 prior to adding them into the spectrum, formed by an accumulator block 130.

The phase, however, is randomly perturbed, imparting noisiness to the spectrum within the partial band. For this purpose, a pseudo-random phase generator 193 is used to generate a different random phase for each partial. The random phase for that partial is then multiplied in an amplifier 195 by a user-specified noisiness parameter $\bar{N}_i$ (which may be zero). The resulting quantity is then added to the original phase using an adder 197. Because a different random phase is used to perturb the phase of each partial, clicking noises that might otherwise result from perturbing the phase at regular intervals are avoided.

Figure 6:
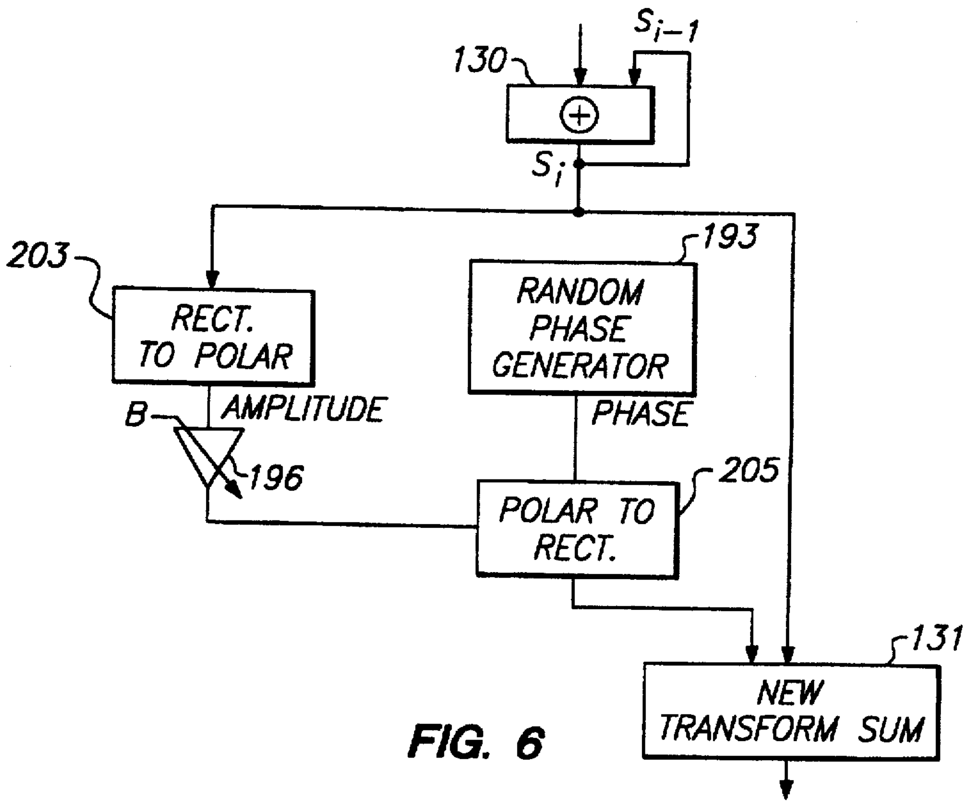
FIG. 6 is a block diagram of a broadband synthesis portion of the sound synthesis system of FIG. 3 in accordance with another embodiment of the invention.

In other instances, it may be deskable to inject noise into a previously-constructed spectrum using the spectrum itself to describe a noise envelope. This manner of noise injection (which is in fact a particular case of transform domain filtering) may be accomplished as shown in FIG. 6. A previously-computed transform sum is written from block 130 into a block 131 that holds a new transform sum. The amplitude within each bin of the old transform sum is computed in a rectangular to polar converter 203 and multiplied (in an amplifier 196) by a user-specified "global noisiness" parameter B. The result is a noise envelope having the same shape as the original spectrum. Because of this characteristic, the resulting noise may be termed "reflected noise." As in the previous noise-injection technique, a pseudo-random phase generator 193 is used to randomly perturb the phase of the spectrum. In FIG. 6, however, a single random value is input to a polar to rectangular converter 205 and thereby added to the phase within each bin of the new transform sum.

Note that, where random, pseudo-random, and noise signals are described, those familiar with the art will be able to adapt the statistical distribution and/or the spectrum of those signals to achieve further dimensions of control over the sounds generated using such signals.

Figure 7:
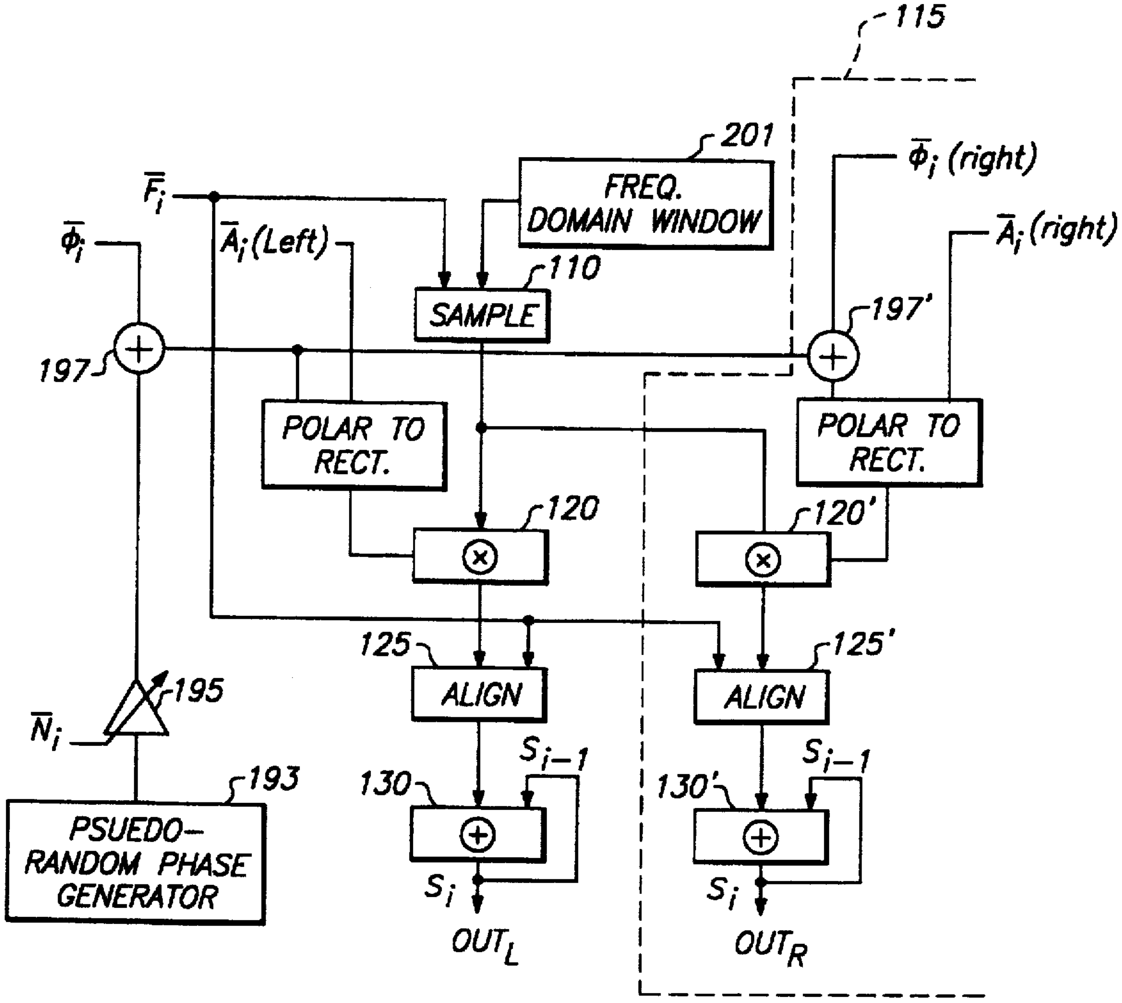
FIG. 7 is a simplified block diagram corresponding to multiple channels of the sound synthesis system of FIG. 3 according to a first embodiment.

The foregoing noise-injection techniques have been described in terms of adding noise to a single spectrum. By creating multiple related spectra, numerous useful effects may be achieved. Referring to FIG. 7, blocks on the left-hand side of the dashed line 115 correspond to like-numbered blocks in FIG. 5. Instead of specifying the desired sound in terms of a single partial amplitude $\bar{A}_i$, however, two amplitudes are specified, $\bar{A}_i$(left) corresponding to a left speaker channel and $\bar{A}_i$(right) corresponding to a right speaker channel. By extension, any number of amplitudes $\bar{A}_{i1}, \bar{A}_{i2} \ldots \bar{A}_{in}$ may be specified in order to synthesize n output channels.

In the exemplary embodiment of FIG. 7, the left amplitude parameter $\overline{A}_i$(left) is applied to the multiplier 120 on the left-hand side of the dashed line in order to create in block 130 a transform sum corresponding to a left-channel output $OUT_L$. The multiplication, alignment, and transform sum blocks on the left-hand side of the dashed line 115 (blocks 120, 125 and 130, respectively) are duplicated on the right-hand side of the dashed line as blocks 120', 125' and 130', respectively. The right amplitude parameter $\overline{A}_i$(right) is applied to the multiplier 120' on the right-hand side of the dashed line in order to create in block 130' a transform sum corresponding to a right-channel output $OUT_R$.

Note that the frequency domain window storage and sampling blocks 201 and 110, as well as elements 193, 195 and 197 of the noise-injection mechanism are shared by both channels. An adder 197' is provided, however, in order to achieve various phasing effects. The adder 197' is used to modulate the phase of the right-hand channel in relation to the phase of the left-hand channel in accordance with a parameter $\Phi_i$(mod).

In contrast to the conventional method of mixing output signals, the system of FIG. 7 allows the contributions of each partial to be efficiently distributed among multiple outputs, greatly extending the practical applications of additive synthesis. For example, using multiple speakers, a broad sound field like that of a piano may be created in which different frequencies originate at points distributed in space more effectively than by the use of conventional panning techniques. Also, signals may be filtered by frequency and routed to loud speakers optimized for a particular frequency range, eliminating the need for a crossover network. In the system of FIG. 7, no crossover filter is needed—partials are simply weighted according to their frequency in the synthesis stage.

Furthermore, using adders corresponding to the adder 197' in FIG. 7, each partial may be efficiently and individually phase modulated as it is routed to each output channel. This ability may be used to create special phasing effects, compensate for the phase response of loud speakers, or manipulate a sound's spatial percept.

Figure 8:
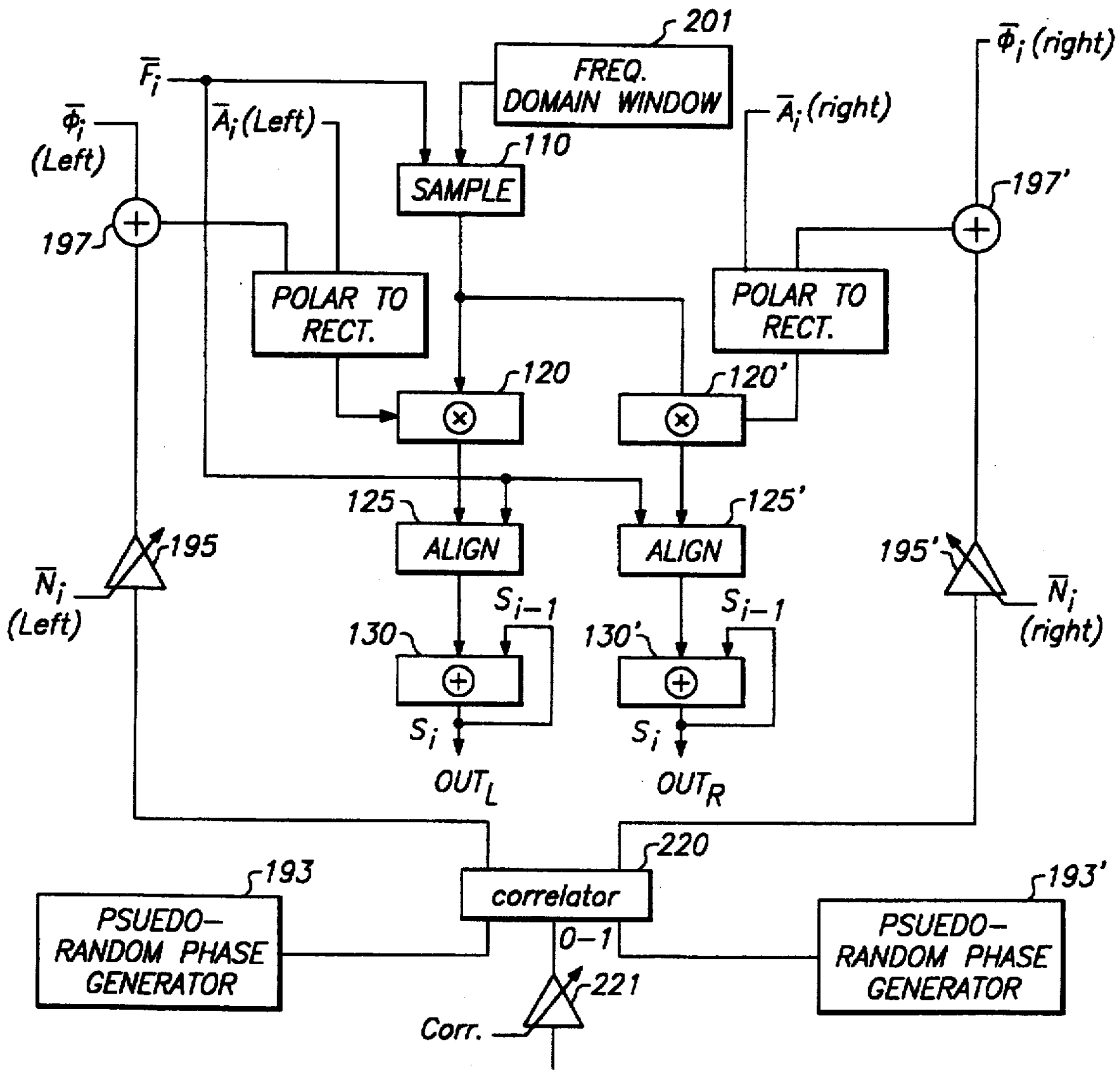
FIG. 8 is a simplified block diagram corresponding to multiple channels of the sound synthesis system of FIG. 3 according to a second embodiment.

In FIG. 7, the noise components of two sound channels are the same, with the phase of the second sound channel being specified by an offset relative to the phase of the first sound channel. In the more general case, the phase of each channel may be specified independently, and noise in different channels may either be specified independently or, if desired, correlated to varying degrees to the extent of, in the limiting case, being fully correlated. Referring to FIG. 8, the pseudo-random phase generator and amplifier blocks (blocks 193 and 195, respectively) are duplicated as blocks 193' and 195', respectively. There is further provided a correlator 220 and an amplifier 221. The correlator 220 receives pseudo-random phases generated by the pseudo-random phase generators 193 and 193' and correlates those pseudo-random phases to a varying degree as controlled by a correlation control signal Corr. input to the amplifier 221. The output of the amplifier 221 is assumed to have a range of zero to one. The correlator 220, in response to the output of the amplifier 221, outputs two pseudo-random phases that may range from uncorrelated (zero), moderately correlated, highly correlated, to fully correlated (one). The two pseudo-random phases are input to the respective amplifiers 195 and 195', the respective output signals of which are used to perturb the phase inputs $\overline{\Phi}_i$(left and $\overline{\Phi}_i$(right).

Typically in the foregoing process, after sound samples have been converted to an analog sound signal by D/A conversion, the resulting audio signal must still be filtered using a relatively expensive analog filter to remove artifacts, caused for example, by foldover of energy from "negative" frequencies. An alternative is to, prior to D/A conversion, upsample, or rate convert, the sample stream to a higher sample rate using an interpolating digital filter. A faster D/A converter must then be used to convert the higher-rate signal, but the analog filter required for final filtering may be very simple and inexpensive. One problem with such an approach is that upsampling can introduce up to several milliseconds of additional delay. In a real-time environment, this additional delay may not be tolerable.

Figure 9:
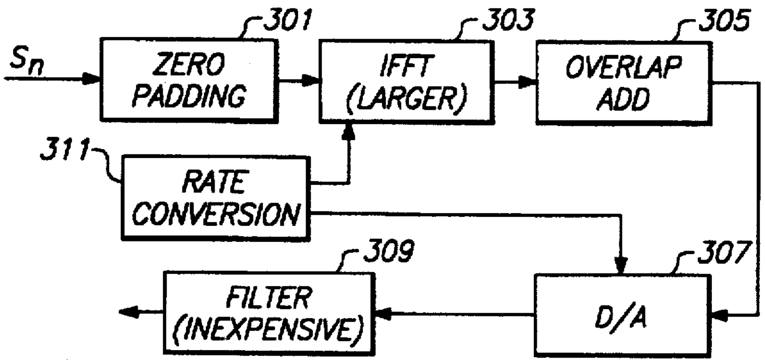
FIG. 9 is a block diagram corresponding to a single channel of the sound synthesis system of FIG. 3, illustrating a manner in which pre-filtering of the sound output signal is performed in the transform domain.

A further feature of the present invention uses transform-domain filtering to achieve the same effect as upsampling without introducing additional delay. Referring to FIG. 9, while a spectrum $S_n$ is still in the transform domain, the spectrum is zero-padded in a zero padding block 301, after which a larger inverse transform than previously discussed is performed by an IFFT block 303. To avoid processing delays, the IFFT block 303 may be realized by a special-purpose IFFT integrated circuit. An overlap-add operation is then performed by a block 305 to produce a sample stream, which is converted by a D/A converter 307 at a higher rate than previously discussed. A rate conversion block 311 controls timing of the inverse transform and the digital conversion. Zero padding is performed such that the resulting audio signal produced by the D/A converter 307 does not have significant energy above a frequency of 44 KHz. The audio signal is then filtered using an inexpensive analog filter 309, and applied to an audio speaker.

The described methods of sound synthesis enable complex, realistic sounds to be synthesized and controlled in real time. Various alternative methods are provided for injecting noise, often the most problematic part of a sound to model and synthesize, into a spectrum. These methods are both computationally efficient and avoid many of the artificial constraints associated with prior methods. Various applications of transform-domain filtering are also provided, in some instances enabling external hardware components to be moved into the synthesis stage and in other instances enabling entirely new types of real-time control of sound synthesis to be performed. Polyphony is also provided for in a computationally-efficient manner.

It will be appreciated by those of ordinary skill in the art that the invention can be embodied in other specific forms without departing from the spirit or essential character thereof. The presently disclosed embodiments are therefore considered in all respects to be illustrative and not restrictive. The scope of the invention is indicated by the appended claims rather than the foregoing description, and all changes which come within the meaning and range of equivalents thereof are intended to be embraced therein.

What is claimed is:

1. A method of producing a time-sampled representation of a sound having both narrowband components and broadband noise components, comprising the steps of:

specifying said sound at each of a plurality of successive instants as a sum of a plurality of sound partials, each defined parametrically in terms of a plurality of parameters;

for each of said sound partials:

selecting values from a transformed function, based on at least one of said parameters;

generating a random number;

scaling said random number, based on at least one of said parameters, to produce a scaled random number;

using said scaled random number to vary at least one of said parameters to produce a varied parameter;

scaling said values selected from said transformed function, based on at least said varied parameter, to produce scaled values; and adding said scaled values to an array of values representing said sound;

applying an inverse discrete mathematical transform to said array of values to produce a time-sampled representation of said sound over a time interval; and blending time-sampled representations of said sound over adjacent time intervals to produce said time-sampled representation of said sound.

2. The method of claim 1, wherein said at least one parameter is a phase parameter, and said varied parameter is a modified phase parameter.

3. The method of claim 2, wherein scaling said values comprises scaling said values based on said modified phase parameter and based on an amplitude parameter.

4. A method of producing a time-sampled representation of a sound, comprising the steps of:

specifying said sound at each of a plurality of successive instants as a sum of a plurality of sound partials, each defined parametrically in terms of a plurality of parameters;

for each of said sound partials:

selecting values from a transformed function, based on at least one of said parameters;

scaling said values selected from said transformed function, based on at least one of said parameters, to produce scaled values; and adding said scaled values to values stored within an array of vectors representing said sound, each vector containing a plurality of values;

generating a random number;

for a each one of a plurality of said ranges within said array:

determining an average magnitude of vectors within said range;

scaling said average magnitude, to produce a scaled average magnitude; and adding to each vector within said range of vectors a vector determined by said scaled magnitude and said random number;

applying an inverse discrete mathematical transform to said array of vectors to produce a time-sampled representation of said sound over a time interval; and blending time-sampled representations of said sound over adjacent time intervals to produce said time-sampled representation of said sound.

5. A method of producing a visual representation of a sound, comprising the steps of:

specifying said sound at each of a plurality of successive instants as a sum of a plurality of sound partials, each defined parametrically in terms of a plurality of parameters;

for each of said sound partials:

selecting values from a transformed function, based on at least one of said parameters;

scaling said values selected from said transformed function, based on at least one of said parameters, to produce scaled values; and adding said scaled values to an array of values representing said sound; and based on said array of values, generating a graphical representation of said sound.

6. A method of producing a visual representation of a sound, comprising the steps of:

specifying said sound at each of a plurality of successive instants as a sum of a plurality of sound partials, each defined parametrically in terms of a plurality of parameters;

for each of said sound partials:

selecting values from a transformed function, based on at least one of said parameters;

scaling said values selected from said transformed function, based on at least one of said parameters, to produce scaled values; and adding said scaled values to an array of values representing said sound; and based on said plurality of parameters, generating a graphical representation of said sound.

7. A method of producing a time-sampled representation of a sound, comprising the steps of:

specifying said sound at each of a plurality of successive instants as a sum of a plurality of sound partials, each defined parametrically in terms of a plurality of parameters;

for each of said sound partials:

selecting values from a transformed function, based on at least one of said parameters;

scaling said values selected from said transformed function, based on at least one of said parameters, to produce scaled values; and adding said scaled values to an array of values representing said sound;

varying selected values within said array of values in accordance with a predetermined algorithm, wherein said predetermined algorithm is a model of auditory perception;

applying an inverse discrete mathematical transform to said array of values to produce a time-sampled representation of said sound over a time interval; and blending time-sampled representations of said sound over adjacent time intervals to produce said time-sampled representation of said sound.

8. The method of claim 7, wherein said predetermined algorithm is an automatic gain control algorithm.

9. The method of claim 7, wherein said predetermined algorithm is a frequency-dependent gain control algorithm.

10. The method of claim 7, wherein said predetermined algorithm is a model of auditory perception.

11. The method of claim 7, comprising the further step of using results of said predetermined algorithm to modify said sound.

12. The method of claim 7, comprising the further step of using results of said predetermined algorithm to influence a subsequent sound.

13. A method of producing a multi-channel time-sampled representation of a polyphonic sound, comprising the steps of:

for each voice of said polyphonic sound, specifying said voice at each of a plurality of successive instants as a sum of a plurality of sound partials, each defined parametrically in terms of a plurality of parameters, each partial belonging to a set of partials including one partial for each voice, in which each partial has at least one shared parameter a value of which is shared by all partials of the set, each partial of the set having distinct values for remaining parameters;

for each of said sound partials:

selecting values from a transformed function, based on said at least one shared parameter;

generating a random number scaling said random number, based on at least one of said parameters, to produce a scaled random number;

using said scaled random number to vary at least one of said parameters;

scaling said values selected from said transformed function, based on at least one of said parameters, to produce scaled values; and adding said scaled values to values stored within one of multiple arrays of vectors, each array representing one voice of said polyphonic sound;

applying an inverse discrete mathematical transform to each of said multiple arrays of vectors to produce a time-sampled representation of each voice of said polyphonic sound over a time interval; and blending time-sampled representations of each voice of said polyphonic sound over adjacent time intervals to produce said multi-channel time-sampled representation of said polyphonic sound.

14. A method of producing a multi-channel time-sampled representation of a polyphonic sound, comprising the steps of:

for each voice of said polyphonic sound, specifying said voice at each of a plurality of successive instants as a sum of a plurality of sound partials, each defined parametrically in terms of a plurality of parameters, each partial belonging to a set of partials including one partial for each voice, in which each partial has at least one shared parameter a value of which is shared by all partials of the set, each partial of the set having distinct values for remaining parameters;

for each of said sound partials:

selecting values from a transformed function, based on said at least one shared parameter;

scaling said values selected from said transformed function, based on at least one of said parameters, to produce scaled values; and adding said scaled values to values stored within one of multiple arrays of vectors, each array representing one voice of said polyphonic sound;

applying an inverse discrete mathematical transform to each of said multiple arrays of vectors to produce a time-sampled representation of each voice of said polyphonic sound over a time interval; and blending time-sampled representations of each voice of said polyphonic sound over adjacent time intervals to produce said multi-channel time-sampled representation of said polyphonic sound.

* * * * *